US008907603B2

(12) United States Patent
Shibata

(10) Patent No.: US 8,907,603 B2
(45) Date of Patent: Dec. 9, 2014

(54) STEERING CONTROL APPARATUS

(71) Applicant: JTEKT Corporation, Osaka-shi (JP)

(72) Inventor: Yoshiyuki Shibata, Toyota (JP)

(73) Assignee: JTEKT Corporation, Osaka-shi (JP)

(*) Notice: Subject to any disclaimer, the term of this patent is extended or adjusted under 35 U.S.C. 154(b) by 0 days.

(21) Appl. No.: 13/962,444

(22) Filed: Aug. 8, 2013

(65) Prior Publication Data

US 2013/0320895 A1     Dec. 5, 2013

Related U.S. Application Data

(62) Division of application No. 12/427,983, filed on Apr. 22, 2009, now Pat. No. 8,541,967.

(30) Foreign Application Priority Data

Apr. 23, 2008    (JP) ................. 2008-112011

(51) Int. Cl.
  *H02H 7/08*   (2006.01)
  *H02P 6/24*   (2006.01)
  *B62D 5/04*   (2006.01)

(52) U.S. Cl.
  CPC ............. *H02P 6/24* (2013.01); *B62D 5/0484* (2013.01)
  USPC .......... 318/400.21; 318/563; 318/400.22; 318/782; 318/75; 361/23; 361/31; 361/534

(58) Field of Classification Search
  USPC .......... 318/400.21, 474, 15, 685, 432, 433, 318/434, 496, 8, 9, 10, 11, 12, 254; 361/23, 361/31
  See application file for complete search history.

(56) References Cited

U.S. PATENT DOCUMENTS 5,969,919 A    10/1999  Kobayashi et al.
6,194,849 B1 * 2/2001  Wilson-Jones et al. ......... 318/15
(Continued)

FOREIGN PATENT DOCUMENTS

DE    36 88 438 T2    10/1993
DE    102 23 139      12/2003
(Continued)

OTHER PUBLICATIONS

Office Action (Opposition Statement) issued Sep. 16, 2011, in European Patent Application No. 09158443.3.

(Continued)

*Primary Examiner* — Kawing Chan
*Assistant Examiner* — Jorge L Carrasquillo
(74) *Attorney, Agent, or Firm* — Oblon, Spivak, McClelland, Maier & Neustadt, L.L.P.

(57) ABSTRACT

A steering control apparatus includes a direct current power source, a three-phase alternating current motor, and a motor driving circuit. An emergency switching element is provided on at least two phases of a three-phase power supply line connected to the three-phase alternating current motor within the motor driving circuit, and the emergency switching element is turned off when an abnormality occurs such that the motor driving circuit is disconnected from the three-phase alternating current motor. The emergency switching element is a MOSFET, and the MOSFETs are provided in pairs in each of the two phases of the three-phase power supply line. Further, parasitic diodes of the pairs of MOSFETs are disposed in opposite orientations to each other.

14 Claims, 7 Drawing Sheets

(56) References Cited

U.S. PATENT DOCUMENTS

| | | | |
|---|---|---|---|
| 6,759,823 B2 * | 7/2004 | Witzig | 318/434 |
| 2004/0228050 A1 * | 11/2004 | Recker et al. | 361/23 |
| 2006/0066270 A1 | 3/2006 | Kumagai et al. | |
| 2010/0060222 A1 | 3/2010 | Kezobo et al. | |

FOREIGN PATENT DOCUMENTS

| | | | |
|---|---|---|---|
| DE | 10 2004 023 713 | | 12/2004 |
| DE | 10 2005 001 703 | | 2/2006 |
| EP | 1 587 210 | | 10/2005 |
| EP | 1 628 379 | | 2/2006 |
| EP | 1 826 899 | | 8/2007 |
| JP | 62-236380 | | 10/1987 |
| JP | 2-206911 | | 8/1990 |
| JP | 02206911 A | * | 8/1990 |
| JP | 06-53368 U | | 7/1994 |
| JP | 2004-328847 | | 11/2004 |
| JP | 2004-330883 | | 11/2004 |
| JP | 2004312912 | | 11/2004 |
| JP | 2004312912 A | * | 11/2004 |
| JP | 2005199746 | | 7/2005 |
| JP | 2005199746 A | * | 7/2005 |
| JP | 2006021645 | | 1/2006 |
| JP | 2006021645 A | * | 1/2006 |
| JP | 2007-118930 | | 5/2007 |
| JP | 2007-181356 | | 7/2007 |
| JP | 2007-295658 | | 11/2007 |
| JP | 2008-72865 | | 3/2008 |
| JP | 2008049780 | | 3/2008 |
| JP | 2008049780 A | * | 3/2008 |
| WO | 01/65666 | | 9/2001 |
| WO | 02/094636 | | 11/2002 |
| WO | WO 02094636 A1 | * | 11/2002 |

OTHER PUBLICATIONS

Office Action issued Feb. 27, 2013 in Japanese Application No. 2008-112011.
Office Action issued Oct. 17, 2012 in Japanese Patent Application No. 2008-112011 with English Translation.
Japanese Office Action (2013-009169) dated Jun. 7, 2013 (with English Pretrial Report).
Decision rejecting the opposition (Art. 101(2) EPC) issued Nov. 5, 2013, in Application No. / Patent No. 09 158 443.3-1503 / 2 112 051/.
"Leistungs-MOSFET", Wikipedia, Sep. 12, 2013, 5 pages.
Japanese Office Action issued on May 14, 2014 in corresponding Japanese application No. 2008-112011, with partial English translation.

* cited by examiner

STEERING CONTROL APPARATUS

INCORPORATION BY REFERENCE

This application is a division of and is based upon and claims the benefit of priority under 35 U.S.C. §120 for U.S. Ser. No. 12/427,983, filed Apr. 22, 2009, which claims the benefit of priority under 35 U.S.C. §119 from Japanese Patent Application No. 2008-112011, filed Apr. 23, 2008, the entire contents of each of which are incorporated herein by reference.

BACKGROUND OF THE INVENTION

1. Field of the Invention

The invention relates to a steering control apparatus for assisting steering of a steering wheel by driving a three-phase alternating current motor, that is referred to hereafter as a "steering assist motor", serving as a driving source of an electric power steering apparatus.

2. Description of the Related Art

In this type of steering control apparatus, when the steering assist motor cannot be driven due to an abnormality, the steering assist motor is rotated by the steering of the steering wheel so as to function as a power generator, and as a result, a battery as direct current power source of a vehicle, for example, is charged. Steering resistance generated at this time includes both frictional resistance from a movable portion and resistance required to generate power by converting kinetic energy into electric energy. The resistance required to generate power is referred to hereafter as "power generation resistance". Meanwhile, in a conventional steering control apparatus, a mechanical switch is provided on a power supply line connected to the steering assist motor. In this steering control apparatus, the mechanical switch is turned off when an abnormality occurs such that a motor driving circuit provided in the steering control apparatus is disconnected from the steering assist motor. As a result, the power generation resistance is removed from the steering resistance, and thus a reduction in steering resistance when an abnormality occurs can be achieved such as Japanese Patent Application Publication No. 2005-199746 "JP-A-2005-199746".

However, a malfunction may occur in the mechanical switch due to the infiltration of foreign matter.

SUMMARY OF THE INVENTION

An object of the invention is to provide, at low cost, a steering control apparatus capable of disconnecting a motor driving circuit from a three-phase alternating current motor reliably when an abnormality occurs.

A steering control apparatus according to a first embodiment of the invention includes: a direct current power source installed in a vehicle; a three-phase alternating current motor serving as a driving source of an electric power steering apparatus; a motor driving circuit provided between the direct current power source and the three-phase alternating current motor so as to generate a three-phase alternating current from an output of the direct current power source and conduct the generated three-phase alternating current to the three-phase alternating current motor; an emergency switching element which is provided on at least two phases of a three-phase power supply line connected to the three-phase alternating current motor within the motor driving circuit, and which is turned off when an abnormality occurs such that the motor driving circuit and the three-phase alternating current motor are disconnected, wherein the emergency switching element is a (metal-oxide-semiconductor field-effect transistor) MOSFET, the MOSFETs are provided in pairs in each of the two phases of the three-phase power supply line, and parasitic diodes of the pairs of MOSFETs are disposed in opposite orientations to each other; and an emergency turn off control unit for sequentially turning off the MOSFETs through which no current is flowing or the MOSFETs through which a current oriented to turn the parasitic diodes on is flowing, the emergency turn off control unit turn off all of the MOSFETs when an abnormality occurs.

In the steering control apparatus according to the first embodiment, the emergency switching elements provided on the power supply lines of the motor driving circuit for conducting a current to the three-phase alternating current motor serving as the driving source of the electric power steering apparatus are MOSFETs, and do not therefore malfunction when infiltrated by foreign matter, in contrast to a mechanical switch. In other words, the motor driving circuit and the three-phase alternating current motor can be disconnected reliably when an abnormality occurs.

Further, in the first embodiment, the MOSFETs serving as the emergency switching elements are provided in pairs in each of the two phases of the three-phase power supply line, and the parasitic diodes of the MOSFETs are disposed in opposite orientations to each other. Therefore, when the emergency switching elements are all turned off, a current no longer flows through the two phases of the three-phase power supply line, regardless of orientation. Accordingly, a conductive closed circuit partially including a three-phase phase circuit of the three-phase alternating current motor ceases to exist, and therefore power generation resistance of the three-phase alternating current motor is removed, enabling a reduction in steering resistance when an abnormality occurs.

When an abnormality occurs during conduction of the three-phase alternating current between the motor driving circuit and the three-phase alternating current motor, the MOSFETs through which no current is flowing or the MOSFETs through which a current oriented to turn the parasitic diodes on is flowing are sequentially turned off such that all of the emergency switching elements are turned off. Here, even when the MOSFETs through which a current oriented to turn the parasitic diodes on is flowing are turned off, rapid current blocking does not occur, and therefore a spike voltage is not generated. Needless to say, a spike voltage is not generated when the MOSFETs through which no current is flowing are turned off. Hence, there is no need to use expensive MOSFETs that can withstand a spike voltage as the emergency switching elements, and therefore a reduction in cost can be achieved. In other words, according to the first embodiment, a steering control apparatus that is capable of disconnecting a motor driving circuit and a three-phase alternating current motor reliably when an abnormality occurs can be provided at low cost.

A steering control apparatus according to a second embodiment of the invention includes: a direct current power source installed in a vehicle; a three-phase alternating current motor serving as a driving source of an electric power steering apparatus; a motor driving circuit provided between the direct current power source and the three-phase alternating current motor so as to generate a three-phase alternating current from an output of the direct current power source and conduct the generated three-phase alternating current to the three-phase alternating current motor; an emergency switching element which is provided on a three-phase power supply line connected to the three-phase alternating current motor within the motor driving circuit, and which is turned off when an abnormality occurs such that the motor driving circuit and the three-phase alternating current motor are disconnected, wherein the emergency switching element is a MOSFET, the MOSFET is provided singly in all three phases of the three-phase power supply line, and parasitic diodes of all of the MOSFETs are disposed in an identical orientation relative to the three-phase alternating current motor; and an emergency turn off control unit for sequentially turning off the MOSFETs through which no current is flowing or the MOSFETs through which a current oriented to turn the parasitic diode on is flowing, the emergency turn off control unit turn off all of the MOSFETs when an abnormality occurs.

In the steering control apparatus according to the second embodiment of the invention, the emergency switching elements provided on the power supply lines of the motor driving circuit for conducting a current to the three-phase alternating current motor serving as the driving source of the electric power steering apparatus are MOSFETs, and do not therefore malfunction when infiltrated by foreign matter, in contrast to a mechanical switch. In other words, the motor driving circuit and the three-phase alternating current motor can be disconnected reliably when an abnormality occurs.

Further, in the second embodiment, the MOSFET serving as the emergency switching element is provided singly in all three phases of the three-phase power supply line, and the parasitic diodes of the MOSFETs are disposed in an identical orientation relative to the three-phase alternating current motor. Hence, when the emergency switching elements are all turned off, a conductive closed circuit partially including a three-phase phase circuit of the three-phase alternating current motor ceases to exist, and therefore power generation resistance of the three-phase alternating current motor is removed, enabling a reduction in steering resistance when an abnormality occurs.

When an abnormality occurs during conduction of the three-phase alternating current between the motor driving circuit and the three-phase alternating current motor, the MOSFETs through which no current is flowing or the MOSFETs through which a current oriented to turn the parasitic diodes on is flowing are sequentially turned off such that all of the emergency switching elements are turned off. Here, even when the MOSFETs through which a current oriented to turn the parasitic diodes on is flowing are turned off, rapid current blocking does not occur, and therefore a spike voltage is not generated. Needless to say, a spike voltage is not generated when the MOSFETs through which no current is flowing are turned off. Hence, there is no need to use expensive MOSFETs that can withstand a spike voltage as the emergency switching elements, and therefore a reduction in cost can be achieved. In other words, according to the second embodiment, a steering control apparatus capable of disconnecting a motor driving circuit and a three-phase alternating current motor reliably when an abnormality occurs can be provided at low cost.

In the steering control apparatuses according to the first and second embodiments, a current sensor may be provided in the motor driving circuit, and the emergency turn off control unit may determine whether or not the MOSFETs can be turned off on the basis of the three-phase alternating current detected by the current sensor.

In the above embodiment, the presence and orientation of a current in the respective power supply lines can be determined on the basis of a detection value of the current sensor. The determination as to whether or not the MOSFETs can be turned off, or in other words whether or not a MOSFET is a MOSFET through which no current is flowing or a MOSFET through which a current oriented to turn the parasitic diodes on is flowing, can then be made in accordance with the presence and orientation of the current.

Further, in the steering control apparatuses according to the first and second embodiments, a rotation position sensor may be provided for detecting a rotation position of the three-phase alternating current motor, and the emergency turn off control unit may determine whether or not the MOSFETs can be turned off on the basis of a detection value detected by the rotation position sensor.

In the above embodiment, a current phase of the current of each phase of the three-phase alternating current varies according to the rotation position of the three-phase alternating current motor, and therefore the presence and orientation of a current in the respective power supply lines can be determined on the basis of a detection value of the rotation position sensor provided in the three-phase alternating current motor. The determination as to whether or not the MOSFETs can be turned off, or in other words whether or not a MOSFET is a MOSFET through which no current is flowing or a MOSFET through which a current oriented to turn the parasitic diodes on is flowing, can then be made in accordance with the presence and orientation of the current.

BRIEF DESCRIPTION OF THE DRAWINGS

The features, advantages, and technical and industrial significance of the invention will be described in the following detailed description of example embodiments of the invention with reference to the accompanying drawings, in which like numerals denote like elements, and wherein.

DETAILED DESCRIPTION OF EMBODIMENTS

First Embodiment

Figure 1:
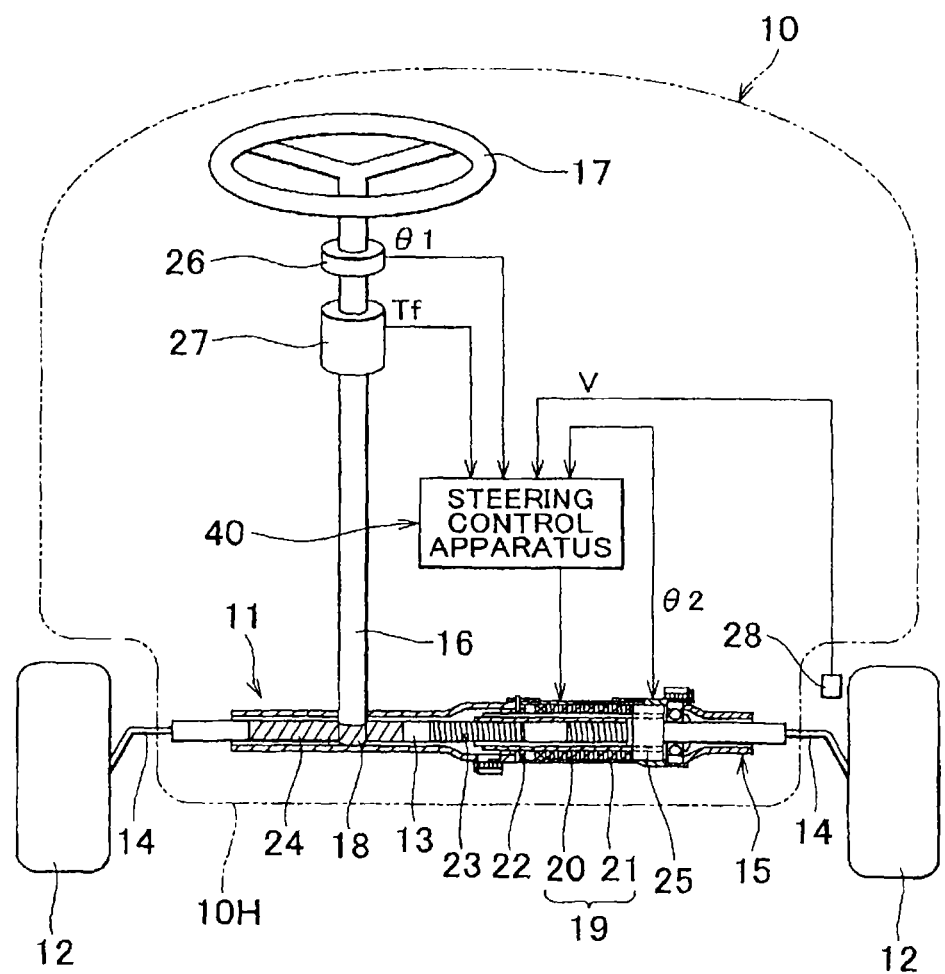
FIG. 1 is a conceptual view of a vehicle installed with a steering control apparatus according to a first embodiment of the invention.

A first embodiment of the invention will be described below on the basis of FIGS. 1 to 5. FIG. 1 shows a vehicle 10 installed with an electric power steering apparatus 11. The electric power steering apparatus 11 includes a shaft 13 that is provided between steered wheels so as to extend in a left-right direction of the vehicle 10, and the shaft 13 provided between the steered wheels is inserted into a core of a tubular housing 15 fixed to a vehicle main body 10H. Further, the two ends of the shaft 13 provided between the steered wheels are connected to respective steered wheels 12, 12 via tie rods 14, 14.

Figure 2:
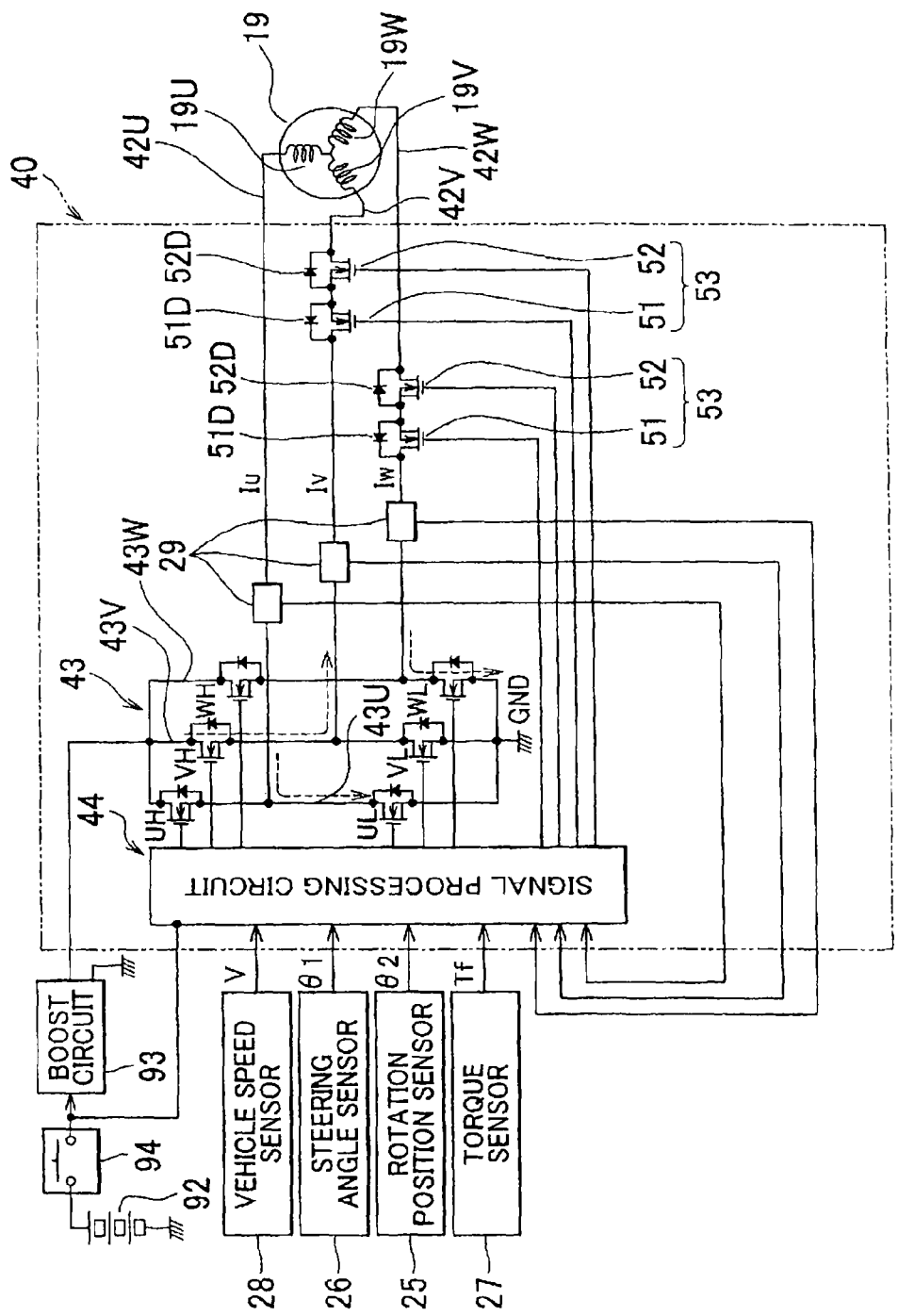
FIG. 2 is a circuit diagram of the steering control apparatus.

A three-phase alternating current motor 19 (to be referred to simply as a "motor 19" hereafter) serving as a driving source of the electric power steering apparatus 11 is a three-phase alternating current motor having a hollow tubular structure, for example. A stator 20 of the motor 19 is fixed within the tubular housing 15, and the shaft 13 provided between the steered wheels penetrates a hollow part of a rotor 21. A ball nut 22 fixed to an inner surface of the rotor 21 and a ball screw portion 23 formed on an outer surface of the shaft 13 provided between the steered wheels are screwed together such that when the rotor 21 rotates, the ball screw portion 23 performs a linear motion. Further, the motor 19 is provided with a rotation position sensor 25 for detecting a rotation position θ2 of the rotor 21. Moreover, as shown in FIG. 2, U, V and W phase windings 19U, 19V, 19W of the motor 19 are star-connected, for example.

As shown in FIG. 1, a rack 24 is formed on one end portion side of the shaft 13 provided between the steered wheels, and a pinion 18 provided on a lower end of a steering shaft 16 meshes with the rack 24. Further, a steering wheel 17 is attached to an upper end of the steering shaft 16, and a torque sensor 27 and a steering angle sensor 26 are attached to an intermediate portion of the steering shaft 16. Furthermore, a vehicle speed sensor 28 for detecting a vehicle speed V from a rotation speed of the steered wheel 12 is provided in the vicinity of the steered wheel 12.

A steering control apparatus 40 according to the invention is installed in the vehicle 10 to drive-control the motor 19. As shown in FIG. 2, the steering control apparatus 40 includes a motor driving circuit 43 and a signal processing circuit 44, and when an ignition switch 94 is turned on, the steering control apparatus 40 is connected conductively to a battery 92 and thereby activated. Further, the signal processing circuit 44 includes a central processing unit (CPU) and a memory, not shown in the drawing, and by executing a program stored in the memory, a drive switching element group UH, UL, VH, . . . to be described below is on/off-controlled.

The motor driving circuit 43 is a three-phase bridge circuit in which U, V, W phase circuits 43U, 43V, 43W are provided between a positive electrode and a negative electrode shown here as GND of a boost circuit 93 connected to the battery 92. A higher stage drive switching element UH and a lower stage drive switching element UL are connected in series to the U phase circuit 43U, and the U phase winding 19U of the motor 19 is connected to a power supply line 42U extending from a common connecting point of the two drive switching elements UH, UL via a current sensor 29 such as a Hall element. Similarly, a higher stage drive switching element VH and a lower stage drive switching element VL are provided in the V phase circuit 43V, and the V phase winding 19V of the motor 19 is connected to a power supply line 42V extending from a common connecting point of the two drive switching elements VH, VL via the current sensor 29. A higher stage drive switching element WH and a lower stage drive switching element WL are provided in the W phase circuit 43W, and the W phase winding 19W of the motor 19 is connected to a power supply line 42W extending from a common connecting point of the two drive switching elements WH, WL via the current sensor 29. Further, the drive switching elements UH, UL, VH, . . . are constituted by N channel type MOSFETs, for example, and gates of the MOSFETs are connected to the signal processing circuit 44.

An emergency switch series circuit 53 is provided at a midway point on each of the V phase and W phase power supply lines 42V, 42W of the motor driving circuit 43. Each emergency switch series circuit 53 is formed by connecting a pair of emergency switching elements 51, 52 in series. In this embodiment, N channel type MOSFETs are used as the emergency switching elements 51, 52. For example, sources of the two emergency switching elements 51, 52 are connected to each other such that parasitic diodes 51D, 52D are oppositely oriented.

Hereinafter, a current flowing to the motor 19 from the motor driving circuit 43 will be referred to as a "positive current", and a current flowing to the motor driving circuit 43 from the motor 19 will be referred to as a "negative current". When the pair of emergency switching elements 51, 52 are to be differentiated, the emergency switching element having the parasitic diode 51D that is capable of conducting the negative current will be referred to as a first emergency switching element 51 and the emergency switching element having the parasitic diode 52D that is capable of conducting the positive current will be referred to as a second emergency switching element 52. Further, the parasitic diodes 51D, 52D shift between a conductive state and a non-conductive state according to the orientation of the current, and therefore function as switches. In consideration of this, a state in which the parasitic diodes 51D, 52D are conductive will be referred to as "on", and a state in which the parasitic diodes are non-conductive will be referred to as "off".

The emergency switching elements 51, 52 receive a gate voltage from the signal processing circuit 44 when the ignition switch 94 is turned on, and are thereby held in an on state. Hence, similarly to the power supply line 42U not having the emergency switch series circuit 53, a current can be passed through the power supply lines 42V, 42W. Further, when the ignition switch 94 is turned off, the emergency switching elements 51, 52 are turned off. When an abnormality occurs, on the other hand, the gate voltage applied to the emergency switching elements 51, 52 from the signal processing circuit 44 is stopped at a predetermined timing even though the ignition switch 94 is on, and as a result, the emergency switching elements 51, 52 are both turned off.

If the emergency switch series circuit 53 is provided with only one emergency switching element, a current can flow in a single direction of the power supply line 42V, 42W via the parasitic diode even when the emergency switching element is off. In this embodiment, however, the pair of emergency switching elements 51, 52 is provided on the respective power lines 42V, 42W and the parasitic diodes 51D, 52D thereof are oppositely oriented. Therefore, when both of the emergency switching elements 51, 52 are turned off, the power lines 42V, 42W enter a completely non-conductive state. Accordingly, the two phase windings 19V, 19W of the U, V and W phase windings 19U, 19V, 19W in the motor 19 are blocked to become incapable of conduction, and as a result, the motor 19 and the motor driving circuit 43 are electrically disconnected.

After the emergency switching elements 51, 52 are turned on, the signal processing circuit 44 executes a steering control program (not shown) stored in the memory, not shown in the drawings, repeatedly to determine a motor current command value on the basis of respective detection results V, θ1, θ2, and Tf from the vehicle speed sensor 28, steering angle sensor 26, rotation position sensor 25, and torque sensor 27. U, V, W phase currents Iu, Iv, Iw based on the motor current command value are then determined on the basis of a detection value of the rotation position sensor 25, whereupon the drive switching element group UH, UL, VH, . . . of the motor driving circuit 43 is on/off-controlled such that the U, V, W phase currents Iu, Iv, Iw are passed through the power supply lines 42U, 42V, 42W of the motor driving circuit 43.

Figure 3A:
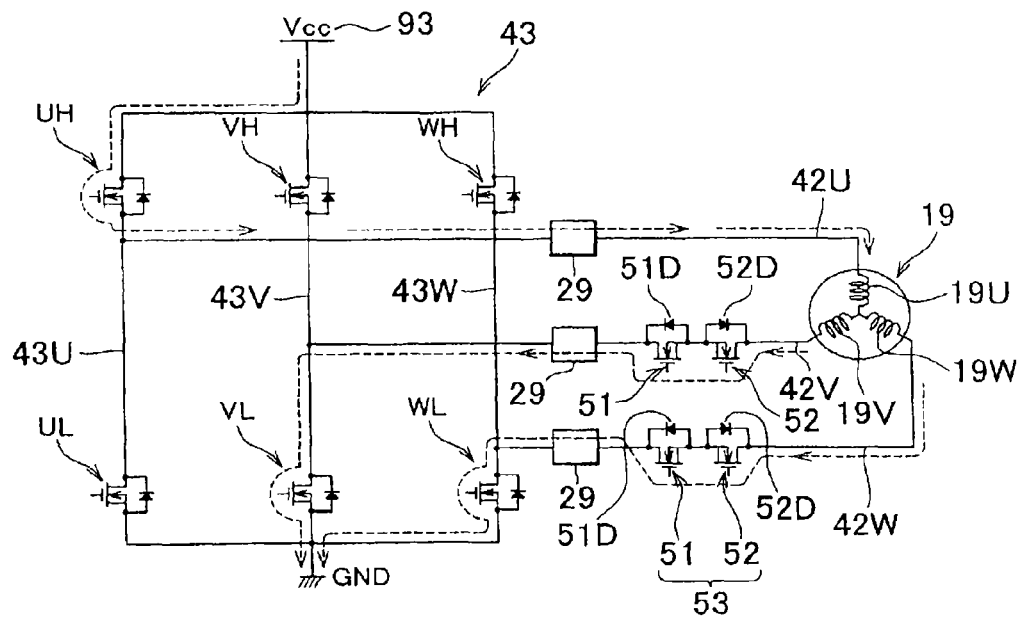
FIGS. 3A-3B are a circuit diagram showing connections between a motor driving circuit and a motor.
Figure 3B:
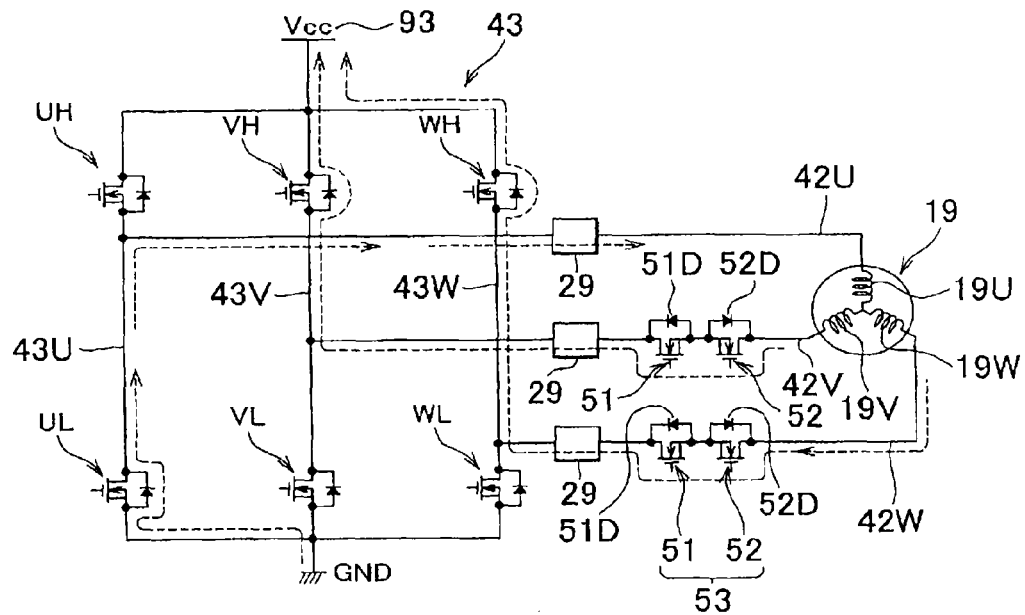

More specifically, the drive switching element group UH, UL, VH, . . . of the motor driving circuit 43 is set in two patterns, namely a pattern in which any one of the higher stage drive switching elements UH, VH, WH is turned on and any two of the lower stage drive switching elements UL, VL, WL are turned on, and a pattern in which any two of the higher stage drive switching elements UH, VH, WH are turned on and any one of the lower stage drive switching elements UL, VL, WL is turned on. As an example, broken line arrows on the motor driving circuit 43 shown in FIG. 3A show the U, V, W phase currents Iu, Iv, Iw of the motor driving circuit 43 when only the U phase drive switching element UH is turned on on the higher stage and only the V phase and W phase drive switching elements VL, WL are turned on on the lower stage, for example. In this case, the U phase current Iu flows from the higher stage of the U phase circuit 43U into the U phase winding 19U of the motor 19 via the power supply line 42U, whereupon the U phase current Iu is separated into the V and W phase windings 19V, 19W of the motor 19 to form the V and W phase currents Iv, Iw. Note that the U, V, W phase currents Iu, Iv, Iw that actually flow through the power supply lines 42U, 42V, 42W are detected by the current sensor 29, whereupon the U, V, W phase currents Iu, Iv, Iw are feedback-controlled by the signal processing circuit 44 on the basis of detected current values thereof.

When the drive switching element group UH, UL, VH, . . . is switched between the and off states, all of the drive switching elements UH, UL, VH, . . . are temporarily turned off to ensure that the higher stage drive switching element UH (VH, WH) and the lower stage drive switching element UL (VL, WL) are not turned on simultaneously, thereby causing a short circuit in the phase circuit 43U (43V, 43W). At this time, electric power stored in the phase windings 19U, 19V, 19W, as an inductor, of the motor 19 is discharged such that a regenerative current flows to the motor driving circuit 43 and the motor 19. Specifically, when all of the drive switching elements UH, UL, VH, . . . are turned off after causing the U, V, W phase currents Iu, Iv, Iw indicated by the broken line arrows in FIG. 3A to flow, a regenerative current indicated by broken line arrows in FIG. 3B flows. More specifically, the regenerative current flows from the lower stage of the U phase circuit 43U to the power supply line 42U and the U phase winding 19U of the motor 19 through the parasitic diode of the U phase lower stage drive switching element UL. The resulting U phase current Iu is then separated into the V and W phase windings 19V, 19W of the motor 19, after which it flows from the motor 19 through the power supply lines 42V, 42W and then flows to the boost circuit 93 through the parasitic diode of the higher stage drive switching element VH of the power supply line 42V and the parasitic diode of the higher stage drive switching element WH of the power supply line 42W.

Figure 5:
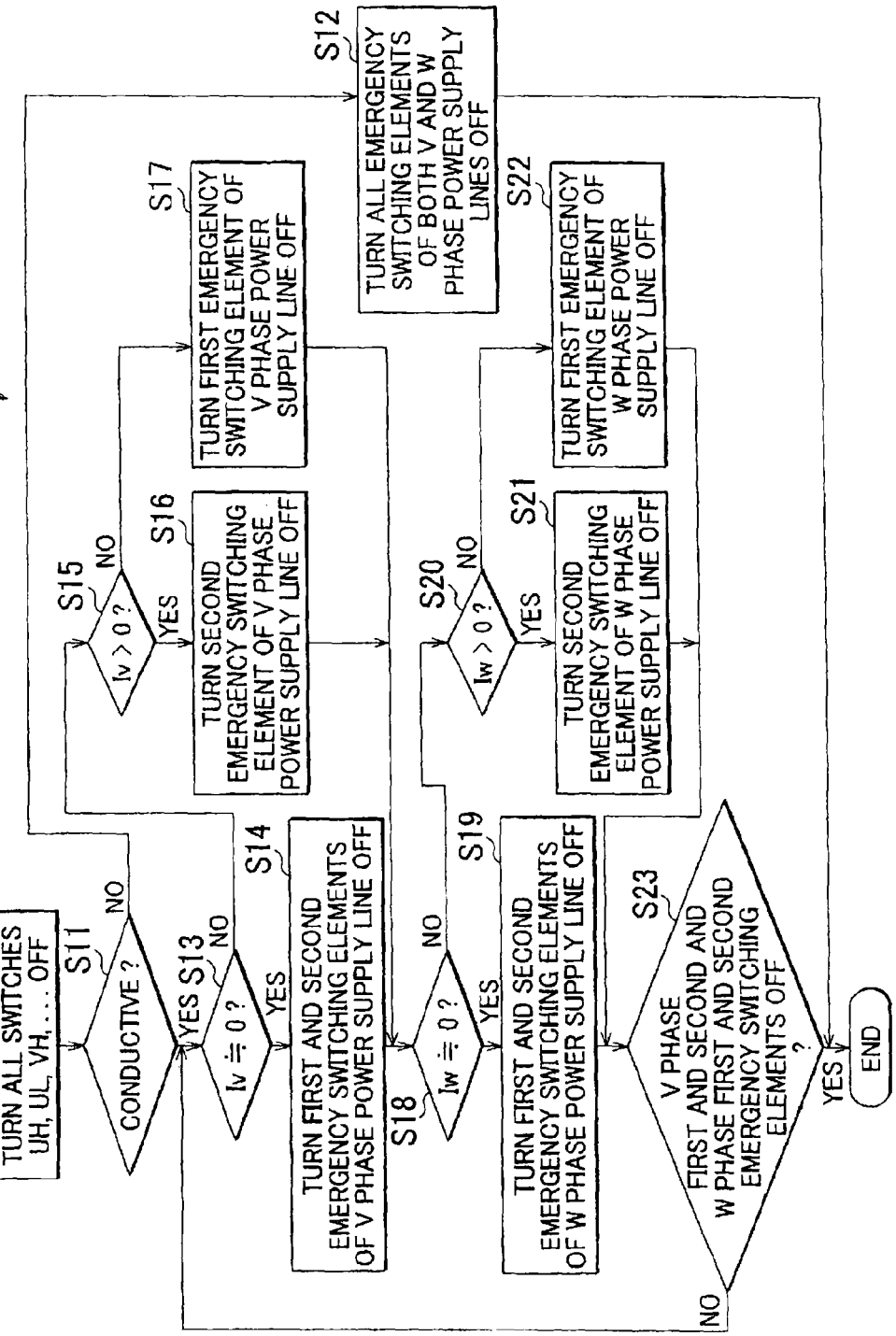
FIG. 5 is a flowchart of an emergency power supply stopping program.

The signal processing circuit 44 of this embodiment performs an interruption to execute an emergency power supply stopping program PG1 shown in FIG. 5 when an abnormality occurs in the vehicle speed sensor 28 or the like, for example. The constitution of the emergency power supply stopping program PG1 will be described below together with the interactions and effects of this embodiment.

Next, the interactions and effects of this embodiment will be described. In the steering control apparatus 40 of this embodiment, during normal travel of the vehicle 10, a three-phase alternating current constituted by the U, V, W phase currents Iu, Iv, Iw generated by the motor driving circuit 43 is conducted to the motor 19 through the emergency switching elements 51, 52, thereby electrifying the motor 19 such that the motor 19 is driven to assist steering. Further, when an abnormality occurs in the vehicle speed sensor 28 or the like, the steering control apparatus 40 performs an interruption to execute the emergency power supply stopping program PG1 shown in FIG. 5. Upon execution of the emergency power supply stopping program PG1, first, the drive switching element group UH, UL, VH, . . . of the U, V, W phase circuits 43U, 43V, 43W in the motor driving circuit 43 are all turned off in S10.

However, the aforementioned regenerative current or a current produced by power generation in the motor 19, for example, may continue to flow to the power supply lines 42U, 42V, 42W even after the motor driving circuit 43 has been stopped. If the emergency switching elements 51, 52 are turned off at the same time as the power supply is stopped by the motor driving circuit 43, a spike voltage is generated, and as a result, the emergency switching elements 51, 52 may be damaged.

Hence, in the emergency power supply stopping program PG1, a determination as to whether or not the power supply lines 42U, 42V, 42W are conductive is made on the basis of the detection result of the current sensor 29 after all of the drive switching elements UH, UL, VH, . . . have been turned off in S11. More specifically, for example, when an effective value of the V phase current Iv is smaller than or equal to a predetermined reference value, it is determined that the power supply line 42V is substantially non-conductive, and when the effective value of the V phase current Iv is greater than the predetermined reference value, it is determined that the power supply line 42V is conductive. When the power supply lines 42U, 42V, 42W are non-conductive corresponding to "NO" in S11, all of the emergency switching elements 51, 52 provided on the power supply lines 42V, 42W are turned off in S12, whereupon the emergency power supply stopping program PG1 is terminated.

When the power supply lines 42U, 42V, 42W are conductive as "YES" in S11, on the other hand, a determination is made as to whether or not the V phase current Iv is substantially 0, or in other words no greater than a predetermined reference value in S13. When the V phase current Iv is substantially 0 as "YES" in S13, the first and second emergency switching elements 51, 52 of the V phase power supply line 42V are turned off in S14. When the V phase current Iv is not 0 as "NO" in S13, on the other hand, a determination is made as to whether or not the V phase current Iv is positive in S15. Note that a "positive" current indicates a current that flows to the motor 19 from the motor driving circuit 43 and a "negative" current indicates a current that flows in the opposite direction, as described above.

When the V phase current Iv is a negative current as "NO" in S15, the first emergency switching element 51 of the V phase power supply line 42V is turned off in S17. When the V phase current Iv is a positive current as "YES" in S15, the second emergency switching element 52 of the V phase power supply line 42V is turned off in S16. In other words, when the V phase current Iv flowing through the V phase power supply line 42V is a positive current, only the MOSFET having the parasitic diode 52D that is turned on by a positive current, from among the MOSFETs serving as the pair of emergency switching elements 51, 52 provided on the V phase power supply line 42V, is turned off. Thus, a situation in which the current is blocked rapidly following turning off is prevented, and as a result, a spike voltage is not generated.

After one or both of the first and second emergency switching elements 51, 52 of the V phase power supply line 42V have been turned off in this manner, a determination is made as to whether or not the W phase current Iw is substantially "0" in S18. When the W phase current Iw is substantially 0 as "YES" in S18, the first and second emergency switching elements 51, 52 of the W phase power supply line 42W are turned off in S19. When the W phase current Iw is not 0 as "NO" in S18, on the other hand, a determination is made as to whether or not the W phase current Iw is positive in S20. When the W phase current Iw becomes "positive" as "YES" in S20, the second emergency switching element 52 of the W phase power supply line 42W is turned off in S21. In this case also, a spike voltage is not generated, similarly to the case in which the second emergency switching element 52 of the V phase power supply line 42V is turned off. When the W phase current Iw is "negative" as "NO" in S20, the first emergency switching element 51 of the W phase power supply line 42W is turned off in S22.

After one or both of the first and second emergency switching elements 51, 52 have been turned off in S19 or S21 or S22, a determination is made as to whether or not all of the V phase first and second emergency switching elements and W phase first and second emergency switching elements are off in S23. When any one of the emergency switching elements is not off as "NO" in S23, the routine returns to step S13, and when all of the emergency switching elements are off as "YES" in S23, the emergency power supply stopping program PG1 is terminated.

When the emergency power supply stopping program PG1 shown in FIG. 5 is executed by the signal processing circuit 44 in this manner, the MOSFETs through which no current is flowing or the MOSFETs through which a current oriented to turn the parasitic diodes 51D, 52D on is flowing are sequentially turned off at the time of an abnormality such that all of the MOSFETs serving as the emergency switching elements 51, 52 are turned off. In other words, in this embodiment, the signal processing circuit 44 during execution of the emergency power supply stopping program PG1 corresponds to an "emergency turn off control unit" according to the invention.

Figure 4A:
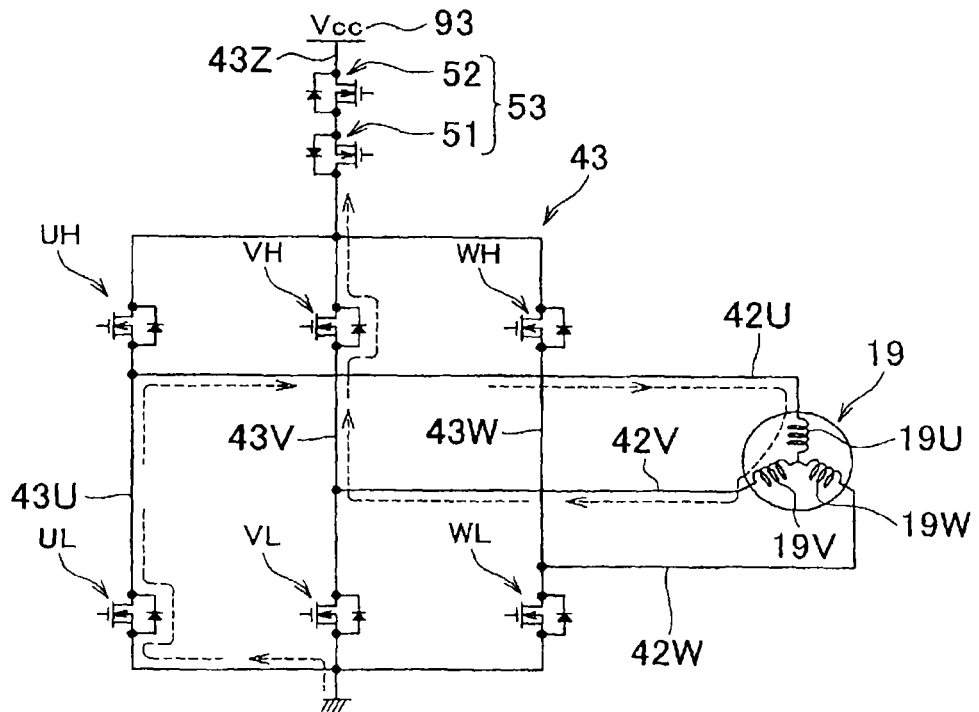
FIGS. 4A-4B is a circuit diagram showing connections between the motor driving circuit and the motor.
Figure 4B:
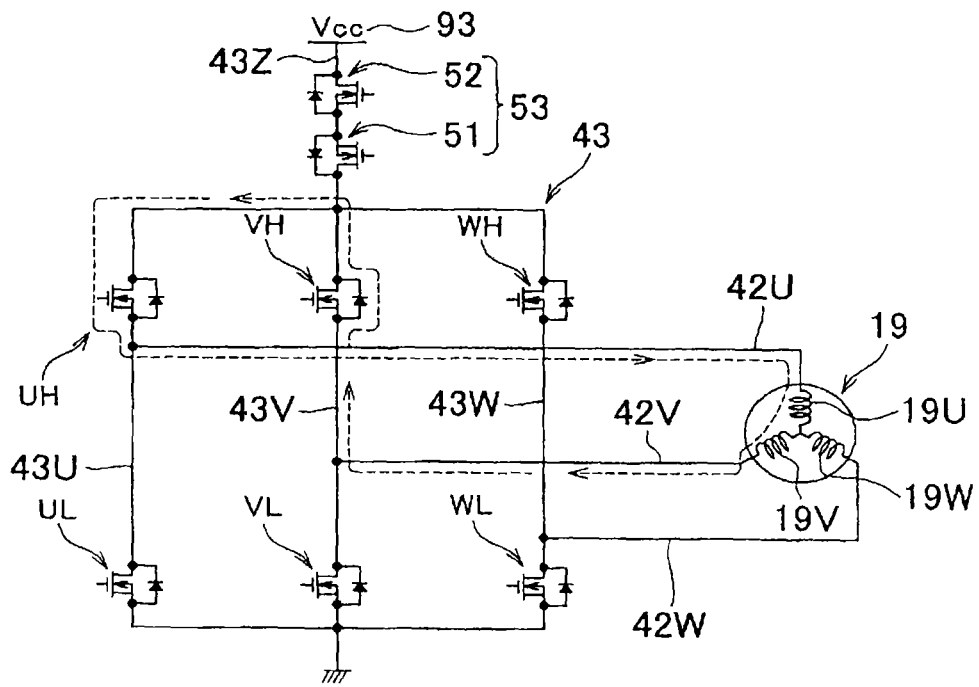

When the emergency power supply stopping program PG1 is terminated, the power supply lines 42V, 42W corresponding to two phases are disconnected such that a conductive closed circuit partially including the phase windings 19U, 19V, 19W of the motor 19 ceases to exist. Here, by modifying the disposition of the emergency switch series circuit 53 such that the emergency switch series circuit 53 is provided at a midway point on a trunk line 43Z connecting the motor driving circuit 43 to the boost circuit 93, as shown in FIG. 4A, for example, a current heading toward the boost circuit 93 through the parasitic diodes of the drive switching element group UH, UL, VH, . . . can be blocked by the emergency switch series circuit 53 at a midway point on the trunk line 43Z when all of the drive switching elements UH, UL, VH, . . . of the motor driving circuit 43 are switched off, as shown by the broken lines in FIG. 4A, for example. However, when the drive switching element UH provided on the higher stage of the U phase circuit 43U is damaged such that the drive switching element UH is permanently on, as shown in FIG. 4B, for example, a conductive closed circuit partially including the phase windings 19U, 19V of the motor 19 is formed, and therefore the power generation resistance of the motor 19 cannot be removed. By disposing the emergency switch series circuit 53 in the manner of this embodiment, on the other hand, a conductive closed circuit partially including the phase windings 19U, 19V, 19W of the motor 19 is completely eliminated when the emergency switching elements 51, 52 included in the emergency switch series circuit 53 are turned off, and therefore the power generation resistance of the motor 19 is removed, enabling a reduction in steering resistance at the time of an abnormality.

The interactions and effects of the embodiment described above can be summarized as follows. In the steering control apparatus 40 according to this embodiment, the emergency switching elements 51, 52 are MOSFETs, and therefore a situation in which foreign matter infiltrates a mechanical switch, causing the mechanical switch to malfunction, can be avoided. Hence, the motor driving circuit 43 and the motor 19 can be disconnected reliably when an abnormality occurs. Further, the MOSFETs through which no current is flowing or the MOSFETs through which a current oriented to turn the parasitic diodes 51D, 52D on is flowing are sequentially turned off, the emergency turn off control unit turn off all of the MOSFETs when an abnormality occurs 51, 52, and therefore a situation in which a current is blocked rapidly can be avoided, thereby preventing generation of a spike voltage. As a result, expensive MOSFETs capable of withstanding a spike voltage need not be used as the emergency switching elements 51, 52, enabling a reduction in cost. In other words, according to this embodiment, a steering control apparatus 40 capable of disconnecting the motor driving circuit 43 and the motor 19 reliably when an abnormality occurs can be provided at low cost.

Figure 6:
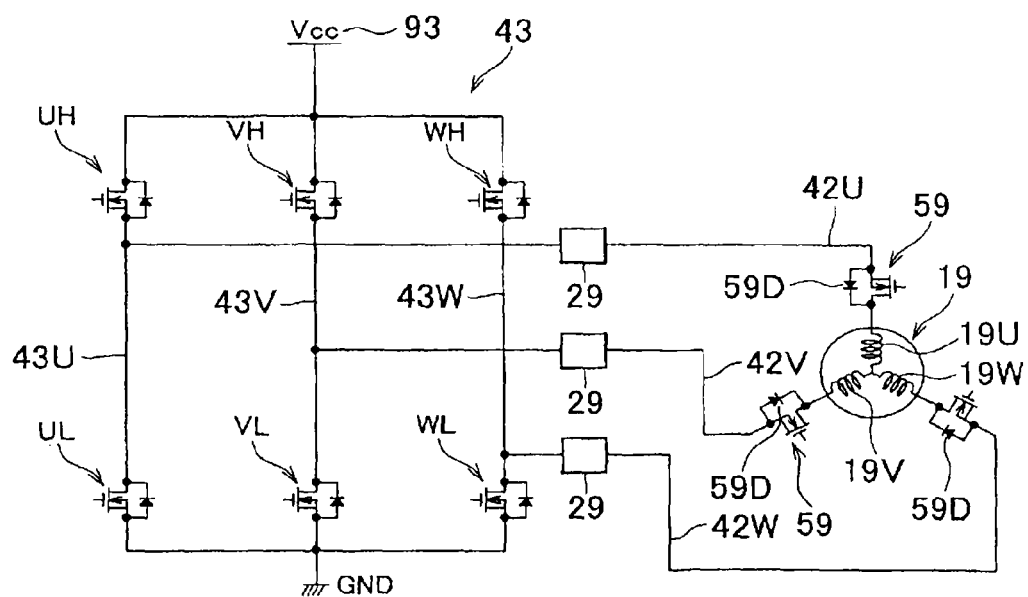
FIG. 6 is a circuit diagram showing connections between a motor driving circuit and a motor according to a second embodiment.
Figure 7:
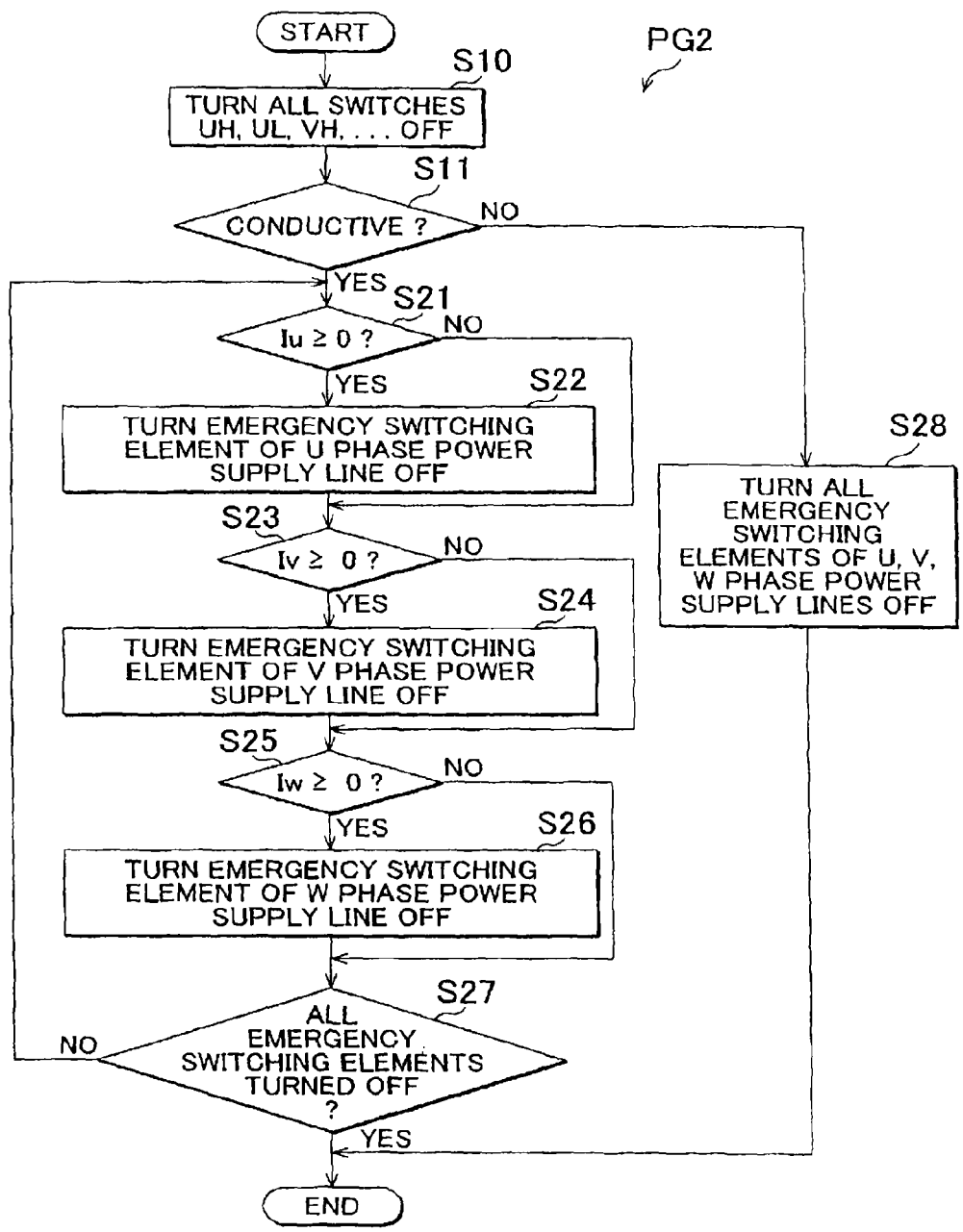
FIG. 7 is a flowchart of an emergency power supply stopping program.

A second embodiment of the invention shown in FIGS. 6 and 7 is structured such that one emergency switching element 59 is connected in series to each of the power supply lines 42U, 42V, 42W of the motor driving circuit 43. The emergency switching element 59 is an N channel type MOSFET, and parasitic diodes 59D, 59D, 59D of the emergency switching elements 59 provided on the respective power supply lines 42U, 42V, 42W are disposed in an identical orientation relative to the motor 19. More specifically, in this embodiment, drains of the MOSFETs serving as the emergency switching elements 59 are connected respectively to the phase circuits 19U, 19V, 19W of the motor 19 such that only a current flowing to the motor 19 can be passed through the parasitic diode 59D.

Further, as shown in FIG. 7, in an emergency power supply stopping program PG2 according to this embodiment, when the power supply lines 42U, 42V, 42W are not conductive as "NO" in S11, the emergency switching elements 59 provided on all of the power supply lines 42U, 42V, 42W are all turned off in S28, whereupon the emergency power supply stopping program PG2 is terminated. In a case where the power supply lines 42U, 42V, 42W are conductive as "YES" in S11, the emergency switching element 59 of the U phase power supply line 42U is turned off in S22 when the U phase current Iu equals or exceeds "0" as "YES" in S21, the emergency switching element 59 of the V phase power supply line 42V is turned off in S24 when the V phase current Iv equals or exceeds "0" as "YES" in S23, and the emergency switching element 59 of the W phase power supply line 42W is turned off in S26 when the W phase current Iw equals or exceeds "0" as "YES" in S25. All other constitutions are identical to their counterparts in the first embodiment, and therefore identical reference symbols to those of the first embodiment have been allocated to duplicate parts and duplicate description thereof has been omitted. Similar interactions and effects to those of the first embodiment are exhibited by the constitution of this embodiment.

The invention is not limited to the above embodiments, and embodiments such as the following, for example, are included in the technical scope of the invention. In addition to the following embodiments, the invention may be implemented after being subjected to various modifications within a scope that does not depart from the spirit of the invention.

(1) In the first embodiment, the invention was applied to a steering control apparatus for a so-called rack electric power steering apparatus in which the tubular motor 19 is connected to the inter-steered wheel shaft 13 by a ball screw mechanism, but the invention may be applied to a steering control apparatus for a pinion electric power steering apparatus in which the motor is connected to the inter-steered wheel shaft by a rack and pinion mechanism or a steering control apparatus for a column electric power steering apparatus in which a motor is connected to a midway point of the steering shaft by a gear.

(2) The emergency switching elements 51, 52, 59 of the first and second embodiments were constituted by N channel type MOSFETs, but may be constituted by P channel type MOSFETs.

(3) The current sensor 29 of the first embodiment was constituted by a Hall element, but may be constituted by a shunt resistor. Further, the disposal location of the current sensor is not limited to the power supply lines 42U, 42V, 42W, and as long as the respective phase currents Iu, Iv, Iw can be detected, the current sensor may be disposed on a circuit provided between the drive switching element group UL, VL, WL and the GND electrode, for example.

(4) In the first embodiment, the determination as to whether or not the respective phase currents Iv, Iw are no smaller than or equal to the predetermined reference value, that is, the respective phase currents Iv, Iw are substantially equal to "0", was made on the basis of the detection value of the current sensor 29, but a determination as to whether or not absolute values of the respective phase currents Iv, Iw are smaller than or equal to the predetermined reference value, that is, absolute values of the respective phase currents Iv, Iw are substantially equal to "0", may be made on the basis of a detection value of the rotation position sensor 25 provided in the motor 19. Further, in the second embodiment, the determination as to whether or not the respective phase currents Iu, Iv, Iw equal or exceed the predetermined reference value was made on the basis of the detection value of the current sensor 29, but a determination as to whether or not absolute values of the respective phase currents Iu, Iv, Iw equal or exceed the predetermined reference value, that is, absolute values of the respective phase currents Iu, Iv, Iw are equal or exceed "0", may be made on the basis of a detection value of the rotation position sensor 25.

What is claimed is:

1. A steering control apparatus comprising:
a direct current power source installed in a vehicle;
a three-phase alternating current motor serving as a driving source of an electric power steering apparatus;
a motor driving circuit provided between the direct current power source and the three-phase alternating current motor so as to generate a three-phase alternating current from an output of the direct current power source and conduct the generated three-phase alternating current to the three-phase alternating current motor, and the motor driving circuit includes a plurality of drive switching elements;
an emergency switching element which is provided in at least two phases of a three-phase power supply line connected to the three-phase alternating current motor within the motor driving circuit, and which is turned off when an abnormality occurs such that the motor driving circuit and the three-phase alternating current motor are disconnected, wherein the emergency switching element is a MOSFET, MOSFETs are provided in pairs in each of the at least two phases of the three-phase power supply line, and parasitic diodes of the pairs of MOSFETs are disposed in opposite orientations to each other; and
an emergency turn off control unit programmed to first turn off all of the plurality of the drive switching elements when an abnormality occurs and then sequentially output commands that sequentially turn off the MOSFETs through which a current oriented to turn the parasitic diodes on is flowing when the abnormality occurs, until all of the MOSFETs are turned off.

2. The steering control apparatus according to claim 1, wherein
the motor driving circuit includes the plurality of drive switching elements connected between the direct current power source and a ground electrode, and
the three-phase power supply line is connected to a connection point between a serially connected pair of the drive switching elements.

3. The steering control apparatus according to claim 2, wherein
a U phase power supply line is connected to the connection point between a pair of U phase drive switching elements,
a V phase power supply line is connected to the connection point between a pair of V phase drive switching elements, and
a W phase power supply line is connected to the connection point between a pair of W phase drive switching elements.

4. The steering control apparatus according to claim 1, further comprising
a current sensor provided in the motor driving circuit,
wherein the emergency turn off control unit determines whether or not the MOSFETs are able to be turned off on the basis of the three-phase alternating current detected by the current sensor.

5. The steering control apparatus according to claim 4, wherein
the emergency turn off control unit determines that the MOSFETs are able to be turned off when the three-phase alternating current detected by the current sensor is smaller than or equal to a predetermined value.

6. The steering control apparatus according to claim 1, further comprising
a rotation position sensor to detect a rotation position of the three-phase alternating current motor,
wherein the emergency turn off control unit determines whether or not the MOSFETs are able to be turned off on the basis of a detected value detected by the rotation position sensor.

7. The steering control apparatus according to claim 1, wherein the emergency switching element does not include a mechanical switch.

8. A steering control apparatus comprising:
a direct current power source installed in a vehicle;
a three-phase alternating current motor serving as a driving source of an electric power steering apparatus;
a motor driving circuit provided between the direct current power source and the three-phase alternating current motor so as to generate a three-phase alternating current from an output of the direct current power source and conduct the generated three-phase alternating current to the three-phase alternating current motor, and the motor driving circuit includes a plurality of drive switching elements;
an emergency switching element which is provided on a three-phase power supply line connected to the three-phase alternating current motor within the motor driving circuit, and which is turned off when an abnormality occurs such that the motor driving circuit and the three-phase alternating current motor are disconnected, wherein the emergency switching element is a MOSFET, the MOSFET is provided singly in all three phases of the three-phase power supply line, and parasitic diodes of all of the MOSFETs are disposed in an identical orientation relative to the three-phase alternating current motor; and an emergency turn off control unit programmed to first turn off all of the plurality of the drive switching elements when an abnormality occurs and then sequentially output commands that sequentially turn off the MOSFETs through which a current oriented to turn the parasitic diode on is flowing when the abnormality occurs, until all of the MOSFETs are turned off.

9. The steering control apparatus according to claim 8, wherein
the motor driving circuit includes the plurality of drive switching elements connected between the direct current power source and a ground electrode, and
the three-phase power supply line is connected to a connection point between a serially connected pair of the drive switching elements.

10. The steering control apparatus according to claim 9, wherein
a U phase power supply line is connected to the connection point between a pair of U phase drive switching elements,
a V phase power supply line is connected to the connection point between a pair of V phase drive switching elements, and
a W phase power supply line is connected to the connection point between a pair of W phase drive switching elements.

11. The steering control apparatus according to claim 8, further comprising
a current sensor provided in the motor driving circuit,
wherein the emergency turn off control unit determines whether or not the MOSFETs are able to be turned off on the basis of the three-phase alternating current detected by the current sensor.

12. The steering control apparatus according to claim 11, wherein
the emergency turn off control unit determines that the MOSFETs are able to be turned off when the three-phase alternating current detected by the current sensor is larger than or equal to a predetermined value.

13. The steering control apparatus according to claim 8, further comprising
a rotation position sensor to detect a rotation position of the three-phase alternating current motor,
wherein the emergency turn off control unit determines whether or not the MOSFETs are able to be turned off on the basis of a detection value detected by the rotation position sensor.

14. A steering control apparatus including a direct current power source installed in a vehicle, a three-phase alternating current motor serving as a driving source of an electric power steering apparatus, and a motor driving circuit provided between the direct current power source and the three-phase alternating current motor so as to generate a three-phase alternating current from an output of the direct current source and conduct the generated three-phase alternating current to the three-phase alternating current motor, the motor driving circuit including a plurality of drive switching elements, comprising:
an emergency switching element which is provided on a three-phase power supply line connected to the three-phase alternating current motor within the motor driving circuit, and which is turned off when an abnormality occurs such that the motor driving circuit and the three-phase alternating current motor are disconnected,
wherein the emergency switching element is a MOSFET, the MOSFET is provided singly in all three phases of the three-phase power supply line and parasitic diodes of all of the MOSFETs are disposed in an identical orientation relative to the three-phase alternating current motor; and
an emergency turn off control unit to first turn off all of the plurality of the drive switching elements when an abnormality occurs and then sequentially turn off the MOSFETs through which no current is flowing or the MOSFETs through which a current oriented to turn the parasitic diode on is flowing, and the emergency turn off control unit turns off all of the MOSFETs when the abnormality occurs.

* * * * *